United States Patent
Yang et al.

(10) Patent No.: US 9,612,990 B2
(45) Date of Patent: Apr. 4, 2017

(54) DUAL MODE DISPLAY-PORT CONNECTOR FOR OPTICAL COMMUNICATION

(71) Applicant: Opticis Co., Ltd., Gyeonggi-do (KR)

(72) Inventors: Dong Pyeong Yang, Gyeonggi-do (KR); Won Seok Jung, Gyeonggi-do (KR); Won Gil Byun, Gyeonggi-do (KR)

(73) Assignee: OPTICIS CO., LTD., Gyeonggi-Do (KR)

(*) Notice: Subject to any disclaimer, the term of this patent is extended or adjusted under 35 U.S.C. 154(b) by 345 days.

(21) Appl. No.: 14/322,789

(22) Filed: Jul. 2, 2014

(65) Prior Publication Data

US 2015/0012682 A1 Jan. 8, 2015

(30) Foreign Application Priority Data

Jul. 2, 2013 (KR) .................. 10-2013-0077288

(51) Int. Cl.
*G06F 13/24* (2006.01)
*G06F 13/40* (2006.01)
(Continued)

(52) U.S. Cl.
CPC .......... *G06F 13/4068* (2013.01); *G06F 3/14* (2013.01); *G06F 13/24* (2013.01); *G09G 5/006* (2013.01);
(Continued)

(58) Field of Classification Search
USPC .................. 710/306–317, 104–110, 260–269
See application file for complete search history.

(56) References Cited

U.S. PATENT DOCUMENTS 7,613,300 B2   11/2009   Kobayashi
8,180,932 B2 *  5/2012   Lee .................. H04L 25/0262
                                                         710/15
(Continued)

FOREIGN PATENT DOCUMENTS

CN   102572353 A    7/2012
JP   2008-506311    2/2008
(Continued)

OTHER PUBLICATIONS

Extended European Search Report issued in EP Application No. 1417518.6 dated Mar. 20, 2015.
(Continued)

*Primary Examiner* — Raymond Phan
(74) *Attorney, Agent, or Firm* — Nixon Peabody, LLP; Khaled Shami

(57) ABSTRACT

A dual mode display-port connector including a host-side auxiliary interface, a display-side auxiliary interface, and a cable. Each of the host-side auxiliary interface and the display-side auxiliary interface includes a bi-directional converter and a direct-current (DC) balancing codec. The bi-directional converter converts differential auxiliary signals received via one side thereof into a single auxiliary signal and a single auxiliary signal received via another side thereof into differential auxiliary signals. The direct-current (DC) balancing codec performs DC balancing encoding on a single auxiliary signal received via one side thereof, and decodes an encoded single auxiliary signal obtained through an encoding process and received via another side thereof.

10 Claims, 10 Drawing Sheets

(51) Int. Cl.
*G09G 5/00* (2006.01)
*G06F 3/14* (2006.01)

(52) U.S. Cl.
CPC ..... *G09G 2370/10* (2013.01); *G09G 2370/18* (2013.01)

(56) References Cited

U.S. PATENT DOCUMENTS

| | | | | |
|---|---|---|---|---|
| 8,276,005 | B2* | 9/2012 | Bae | G09G 5/006 345/204 |
| 8,745,305 | B2* | 6/2014 | Toba | G06F 13/4068 710/313 |
| 9,311,258 | B2* | 4/2016 | Toba | G06F 13/4068 |
| 2005/0182876 | A1* | 8/2005 | Kim | G06F 13/385 710/100 |
| 2009/0153574 | A1 | 6/2009 | Chou et al. | |
| 2010/0165189 | A1 | 7/2010 | Bae et al. | |
| 2010/0177017 | A1* | 7/2010 | Zeng | G06F 3/1431 345/1.1 |
| 2011/0269343 | A1* | 11/2011 | Chen | H01R 24/60 439/626 |
| 2012/0166702 | A1 | 6/2012 | Toba et al. | |
| 2013/0009969 | A1* | 1/2013 | Goldberg | G09G 5/006 345/520 |
| 2013/0323984 | A1* | 12/2013 | Wang | H01R 27/02 439/660 |
| 2014/0297898 | A1* | 10/2014 | Parten | G06F 13/385 710/14 |

FOREIGN PATENT DOCUMENTS

| | | |
|---|---|---|
| JP | 2008-283688 | 11/2008 |
| KR | 10-2005-0022268 A | 3/2005 |
| KR | 10-2008-0100122 A | 11/2008 |
| KR | 10-2011-0026668 | 3/2011 |
| KR | 10-2011-0026668 A | 3/2011 |
| KR | 10-2012-0010665 | 2/2012 |
| KR | 10-2012-0010665 A | 2/2012 |
| KR | 10-2012-0010666 | 2/2012 |
| KR | 10-2012-0010666 A | 2/2012 |

OTHER PUBLICATIONS

Notification of the First Office Action, Jan. 22, 2016, issued in Chinese Patent Application No. 201410312178.X, 15 pages.
Office Action issued in JP Appl. No. 2014-135341 dated Mar. 10, 2015, including an English translation of same, 4 pages total.
Notice of Allowance of Korean Patent Application No. 10-2013-0077288 dated May 27, 2014.

* cited by examiner

DUAL MODE DISPLAY-PORT CONNECTOR FOR OPTICAL COMMUNICATION

RELATED APPLICATIONS

This application claims the benefit of Korean Patent Application No. 10-2013-0077288, filed on Jul. 2, 2013, in the Korean Intellectual Property Office, the disclosure of which is incorporated herein in its entirety by reference.

BACKGROUND

1. Field

One or more embodiments of the present invention relate to dual mode display-port connectors, and more particularly, to a dual mode display-port connector that connects a host device and a display device according to the display-port communication standards proposed by the Video Electronics Standards Association (VESA).

2. Description of the Related Art

FIG. 1 is a block diagram of a general display-port system according to the display-port communication standards proposed by the Video Electronics Standards Association (VESA). In FIG. 1, reference numerals '112' and '122' denote a display-port interface of a host device 11 and a display-port interface of a display device 12, respectively. The general display-port system will be described with reference to FIG. 1 below.

In a controller 121 included in the display device 12, extended display identification data (EDID) which is configuration data and control information of the display device 12 and display-port configuration data (DPCD) which is reception-condition information of the display device 12 are stored.

A controller 111 included in the host device 11 receives the EDID and the DPCD stored in a serial electrically erasable programmable read-only memory (EEPROM) included in the display device 12 and transmits main data to the controller 121 of the display device 12 based on the EDID and the DPCD, according to the display-port communication standards. Here, the main data means image signals including clock signals.

In the transmission of the main data, the controller 111 of the host device 11 establishes DPCD communication with the controller 121 of the display device 12 according to the display-port communication standards (VESA). The DPCD communication (which is also referred to as communication for link-training) will be summarized below.

First, the controller 111 of the host device 11 transmits planned transmission-condition information of the host device 11 to the controller 121 of the display device 12, based on the DPCD.

Second, the controller 121 of the display device 12 receives the main data based on the transmission-condition information.

Third, when an error occurs during the receiving of the main data, the controller 121 of the display device 12 transmits a signal indicating that transmission conditions are not appropriate for the controller 121 itself to the controller 111 of the host device 11 by using a hot plug detection signal HPD. For example, the controller 121 of the display device 12 transmits the hot plug detection signal HPD of a pulse string including a plurality of logic values '1' and '0' to the controller 111 of the host device 11. While the display device 12 operates normally, the controller 121 of the display device 12 transmits the hot plug detection signal HPD of a logic value '1' to the controller 111 of the host device 11.

Fourth, when the signal indicating that the transmission conditions are not appropriate for the controller 121 is generated using the hot plug detection signal HPD, the controller 111 of the host device 11 changes the planned transmission-condition information of the host device 11 and transmits the changed transmission-condition information to the controller 121 of the display device 12.

Fifth, the second to fourth operations are repeatedly performed.

The display-port interface 112 included in the host device 11 includes a main-data transmission unit 112$m$ and an auxiliary data transceiving unit 112$s$.

The main-data transmission unit 112$m$ converts parallel main data received from the controller 111 into differential auxiliary signals, and transmits four pairs of differential auxiliary signals L1+L1−, L2+L2−, L3+L3−, and L4+L4− that consist of eight lines.

The auxiliary data transceiving unit 112$s$ receives a pair of differential auxiliary signals AUX+ and AUX− that consist of two lines from the display device 12, converts the pair of differential auxiliary signals AUX+ and AUX− into parallel input signals according to the display-port communication standards, and inputs the parallel input signals to the controller 111. In contrast, the auxiliary data transceiving unit 112$s$ converts parallel output signals received from the controller 111 into differential auxiliary signals according to the display-port communication standards, and transmits a pair of differential auxiliary signals AUX+ and AUX− that consist of two lines to the display device 12.

In auxiliary data communication as described above, a general single-mode display-port system establishes auxiliary communication using differential auxiliary signals as described above.

However, a dual-mode display-port system establishes auxiliary communication using differential auxiliary signals or inter-integrated circuit (I$^2$C) signals according to a user's selection.

When voltages of a configuration terminal CNF of the host device 11 and a configuration terminal CNF of the display device 12 are low, auxiliary communication is established using the differential auxiliary signals. When the voltages of the configuration terminal CNF of the host device 11 and the configuration terminal CNF of the display device 12 are high, auxiliary communication is established using the I$^2$C signals.

When the configuration terminal CNF of the host device 11 is high and the I$^2$C signals are thus selected, the auxiliary data transceiving unit 112$s$ receives serial data signals SDA from the display device 12, and converts the serial data signals SDA into parallel input signals and inputs the parallel input signal to the controller 111 according to the display-port communication standards. In contrast, the auxiliary data transceiving unit 112$s$ converts parallel output signals received from the controller 111 into serial data signals SDA, and transmits the serial data signals SDA together with a clock signal SCL to the display device 12.

The auxiliary communication using the I$^2$C signals is needed when a display-port interface is switched to a digital visual interface (DVI) or a high-definition multimedia interface (HDMI).

In FIG. 1, reference numeral 'HPD' means the hot plug detection signal transmitted from display device 12. Since the hot plug detection signal HPD indicates a logic '1' state while the display device 12 operates, the controller 111 of the host device 11 may thus determine whether the host device 11 is connected to the display device 12 based on the hot plug detection signal HPD.

The controller 121 of the display device 12 transmits the EDID and the DPCD stored according to the display-port communication standards to the controller 111 of the host device 11, and receives the main data from the controller 111 of the host device 11.

The display-port interface 122 included in the display device 12 includes a main data receiving unit 122*m* and an auxiliary data transceiving unit 122*s*.

The main data receiving unit 122*m* converts four pairs of differential auxiliary signals L1+L1−, L2+L2−, L3+L3−, and L4+L4− that consist of eight lines into parallel input signals and inputs the parallel input signals into the controller 121 according to the display-port communication standards.

In the dual-mode display-port system, when the voltage of the configuration terminal CNF of the display device 12 is low and differential auxiliary signals are thus selected, the auxiliary data transceiving unit 122*s* converts parallel output signals received from the controller 121 into differential auxiliary signals and transmits a pair of differential auxiliary signals AUX+ and AUX− that consist of two lines to the host device 11, according to the display-port communication standards. In contrast, the auxiliary data transceiving unit 122*s* receives the pair of differential auxiliary signals AUX+ and AUX− that consist of two lines from the host device 11, and converts these signals into parallel input signals and inputs the parallel input signals to the controller 121 according to the display-port communication standards.

When the voltage of the configuration terminal CNF of the display device 12 is high and the $I^2C$ signals are thus selected, the auxiliary data transceiving unit 122*s* converts parallel output signals received from the controller 121 into serial data signals SDA based on the $I^2C$ signals, and transmits the serial data signal SDA to the host device 11. In contrast, the auxiliary data transceiving unit 122*s* receives the clock signal SCL and the serial data signal SDA from the host device 11, and converts these signals into parallel input signals and inputs the parallel input signals to the controller 121 according to the display-port communication standards.

According to the general dual-mode display-port system described above with reference to FIG. 1, noise or signal attenuation occurs when the EDID and the DPCD are transmitted using the pair of differential auxiliary signals AUX+ and AUX− or the $I^2C$ signals to a long distance or when long-distance DPCD communication is established.

SUMMARY

One or more embodiments of the present invention include a dual mode display-port connector capable of performing optical communication without causing noise or signal attenuation to occur when extended display identification data (EDID) and display-port configuration data (DPCD) are transmitted using differential auxiliary signals or inter-integrated circuit ($I^2C$) signals to a long distance or when long-distance DPCD communication is established.

Additional aspects will be set forth in part in the description which follows and, in part, will be apparent from the description, or may be learned by practice of the presented embodiments.

According to one or more embodiments of the present invention, a dual mode display-port which connects a host device and a display device according to the display-port communication standards proposed by the Video Electronics Standards Association (VESA) includes a host-side auxiliary interface, a display-side auxiliary interface, and a cable.

The host-side auxiliary interface is connected to auxiliary signal terminals of the host device. The display auxiliary is connector connected to auxiliary signal terminals of the display device; and The cable connects the host-side auxiliary interface and the display-side auxiliary interface, The host-side auxiliary interface includes a bi-directional converter, a direct-current (DC) balancing codec, and a bus switch.

The-directional converter converts differential auxiliary signals received via one side thereof into a single auxiliary signal and a single auxiliary signal received via another side thereof into differential auxiliary signals.

The DC balancing codec performs DC balancing encoding on a single auxiliary signal received via one side thereof, and decodes an encoded single auxiliary signal obtained through an encoding process and received via another side thereof.

The bus switch connects common signal lines to which differential auxiliary signals or inter-integrated circuit ($I^2C$) signals are supplied to differential auxiliary signal lines or $I^2C$ signal lines.

In the host-side auxiliary interface, the common signal lines may be drawn from the auxiliary signal terminals of the host device and connected to the bus switch.

The host-side auxiliary interface may further include a host-side controller for controlling a switching operation of the bus switch according to a voltage of a configuration terminal among the auxiliary signal terminals of the host device.

The host-side auxiliary interface may further include a first electrophotic converter, a photoelectric converter, and a second electrophotic converter.

When the $I^2C$ signals are selected according to a voltage of a configuration terminal of the host device, a clock signal may be transmitted in the form of an optical signal to the display-side auxiliary interface from the first electrophotic converter, a serial data signal may be transmitted in the form of an optical signal to the photoelectric converter from the display-side auxiliary interface, and a serial data signal may be transmitted in the form of an optical signal to the display-side auxiliary interface from the second electrophotic converter.

When the differential auxiliary signals are selected according to the voltage of the configuration terminal of the host device, an encoded single auxiliary signal obtained through an encoding process may be transmitted in the form of an optical signal to the display-side auxiliary interface from the first electrophotic converter, and encoded single auxiliary signal obtained through an encoding process may be transmitted in the form of an optical signal to the photoelectric converter from the display-side auxiliary interface.

The bi-directional converter may convert the differential auxiliary signals received from the bus switch via the differential auxiliary signal lines into a single auxiliary signal and output the single auxiliary signal to the DC balancing codec, and convert a decoding signal received from the DC balancing codec into differential auxiliary signals and output the differential auxiliary signals to the bus switch via the differential auxiliary signal lines.

The DC balancing codec may include a DC balancing encoder and a decoder.

The DC balancing encoder may perform DC balancing encoding on the single auxiliary signal received from the bi-directional converter, and output an encoded single auxiliary signal obtained by performing DC balancing encoding on the single auxiliary signal to the first electrophotic converter.

The decoder may decode the encoded single auxiliary signal from the photoelectric converter and output the decoded single auxiliary signal to the bi-directional converter.

A host connection including the host-side auxiliary interface may further include a host-side main interface and a host-side access-signal interface.

The host-side main interface may be connected to main signal terminals of the host device. The host-side HPD interface may be connected to a hot plug detection signal terminal of the host device.

A display connection unit including the display-side auxiliary interface may further include a display-side main interface and a display-side access-signal interface.

The display-side main interface may be connected to main signal terminals of the display device. The display-side access-signal interface may be connected to a hot plug detection signal terminal of the display device.

Main data that is to be transmitted from the host-side main interface to the display-side main interface may be transmitted in the form of an optical signal, and an access signal that is to be transmitted from the display-side access-signal interface to the host-side access-signal interface may be transmitted in the form of an optical signal.

The host-side main interface may include a plurality of subtractors and a plurality of electrophotic converters.

The plurality of subtractors convert differential main signals received from the main signal terminals of the host device into single main signals, respectively.

The plurality of electrophotic converters convert the single main signals received from the plurality of subtractors into optical signals, and transmit the optical signals to the display-side main interface via optical fiber lines thereof, respectively.

The display-side main interface may include a plurality of photoelectric converters and a plurality of differential signal generators.

The plurality of photoelectric converters convert optical signals received from the host-side main interface via optical fiber lines thereof into main data signals; and the plurality of differential signal generators convert the main data signals received from the plurality of photoelectric converters into differential main-data signals, respectively.

According to one or more embodiments of the present invention, a dual mode display-port connector which connects a host device and a display device according to the display-port communication standards proposed by the Video Electronics Standards Association (VESA) includes a host-side auxiliary interface, a display-side auxiliary interface, and a cable.

The host-side auxiliary interface is connected to auxiliary signal terminals of the host device. The display-side auxiliary interface is connected to auxiliary signal terminals of the display device. The cable connects the host-side auxiliary interface and the display-side auxiliary interface.

The display-side auxiliary interface includes a bi-directional converter, a DC balancing codec, and a bus switch.

The bi-directional converter converts differential auxiliary signals received via one side thereof into a single auxiliary signal and a single auxiliary signal received via another side thereof into differential auxiliary signals.

The DC balancing codec performs DC balancing encoding on a single auxiliary signal received via one side thereof, and decodes an encoded single auxiliary signal obtained through an encoding process and received via another side thereof.

The bus switch connects common signal lines to which differential auxiliary signals or inter-integrated circuit ($I^2C$) signals are supplied to differential auxiliary signal lines or $I^2C$ signal lines.

In the display-side auxiliary interface, the common signal lines may be drawn from the auxiliary signal terminals of the display device and connected to the bus switch.

The display-side auxiliary interface may further include a display-side controller for controlling a switching operation of the bus switch according to a voltage of a configuration terminal among the auxiliary signal terminals of the host device.

The display-side auxiliary interface may further include a first photoelectric converter, an electrophotic converter, and a second photoelectric converter.

When the $I^2C$ signals are selected according to a voltage of a configuration terminal of the display device, a clock signal may be transmitted in the form of an optical signal to the first photoelectric converter from the host-side auxiliary interface, a serial data signal may be transmitted in the form of an optical signal to the host-side auxiliary interface from the electrophotic converter, and a serial data signal may be transmitted in the form of an optical signal to the second photoelectric converter from the host-side auxiliary interface.

When the differential auxiliary signals are selected according to the voltage of the configuration terminal of the display device, an encoded auxiliary signal obtained through an encoding process may be transmitted in the form of an optical signal to the first photoelectric converter from the host-side auxiliary interface, and an encoded single auxiliary signal obtained through an encoding process may be transmitted in the form of an optical signal to the host-side auxiliary interface from the electrophotic converter.

The bi-directional converter included in the display-side auxiliary interface converts differential auxiliary signals received from the bus switch of the display-side auxiliary interface via the differential auxiliary signal lines into a single auxiliary signal and outputs the single auxiliary signal to the DC balancing codec, and converts a decoding signal received from the DC balancing codec into differential auxiliary signals and outputs the differential auxiliary signals to the bus switch via the differential auxiliary signal lines.

The bi-directional converter included in the display-side auxiliary interface may convert differential auxiliary signals received from the bus switch of the display-side auxiliary interface via the differential auxiliary signal lines into single auxiliary signal and output the single auxiliary signal to the DC balancing codec, and convert a decoding signal received from the DC balancing codec into differential auxiliary signals and output the differential auxiliary signals to the bus switch via the differential auxiliary signal lines.

The DC balancing codec may include a DC balancing encoder and a decoder.

The DC balancing encoder performs DC balancing encoding on the single auxiliary signal received from the bi-directional converter, and outputs an encoded single auxiliary signal obtained by performing DC balancing encoding on the single auxiliary signal to the electrophotic converter.

The decoder decodes the encoded single auxiliary signal received from the first photoelectric converter and outputs the decoded single auxiliary signal to the bi-directional converter.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The following description and the accompanying drawings are provided to help understand the present invention. Here, parts of the present invention that are obvious to those of ordinary skill in the art may be omitted.

Also, the following description and the accompanying drawings are not intended to restrict the scope of the present invention and only used for a better understanding of (to facilitate the understanding of) the present invention. The sprint and scope of the present invention are defined in the appended claims. The terms used herein should be understood as meanings and concepts to most appropriately describe the present invention in accordance with the technical idea of the present invention.

Hereinafter, exemplary embodiments of the present invention will be described with reference to the accompanying drawings.

Figure 1:
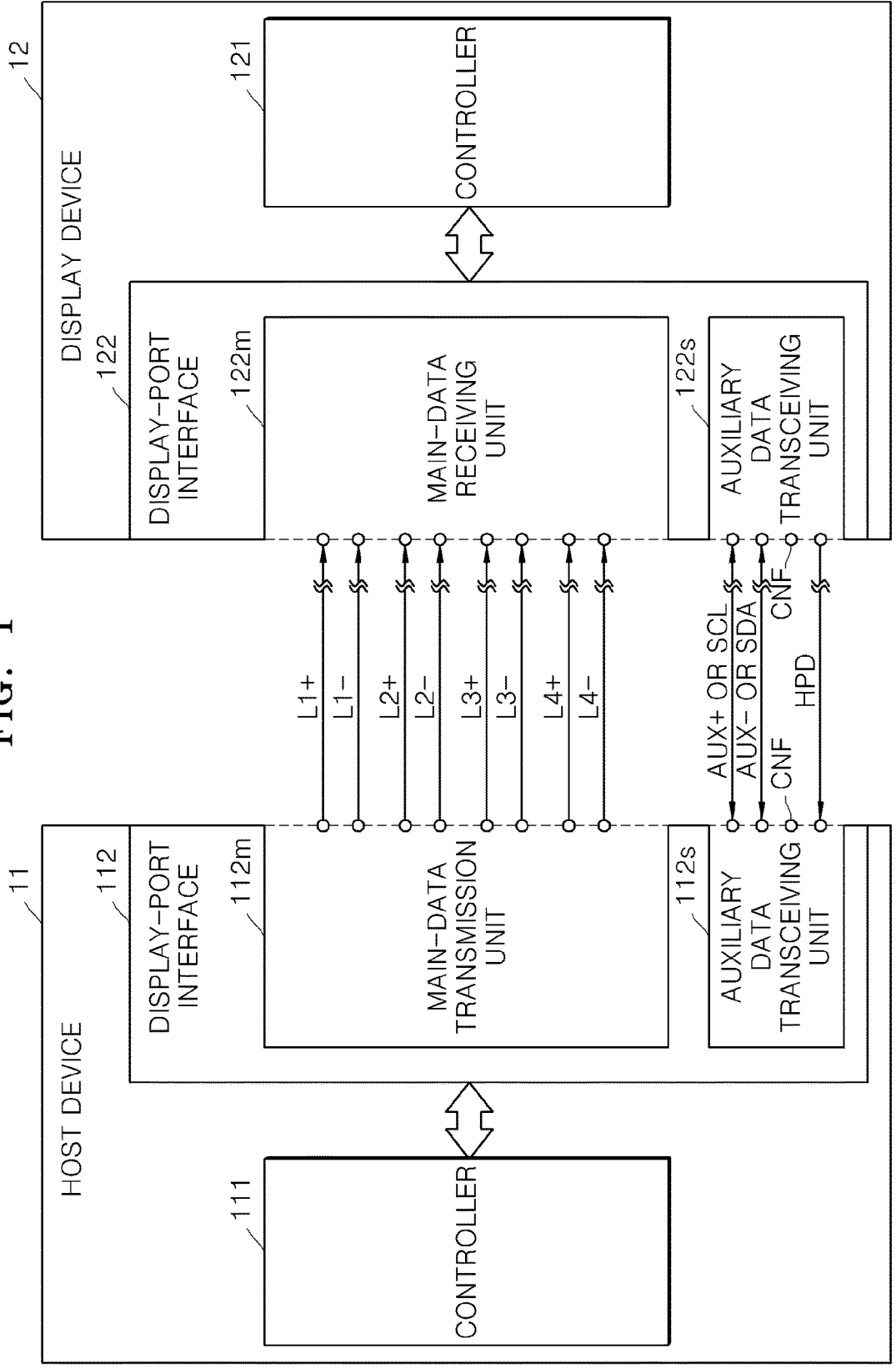
FIG. 1 is a block diagram of a general display-port system.
Figure 2:
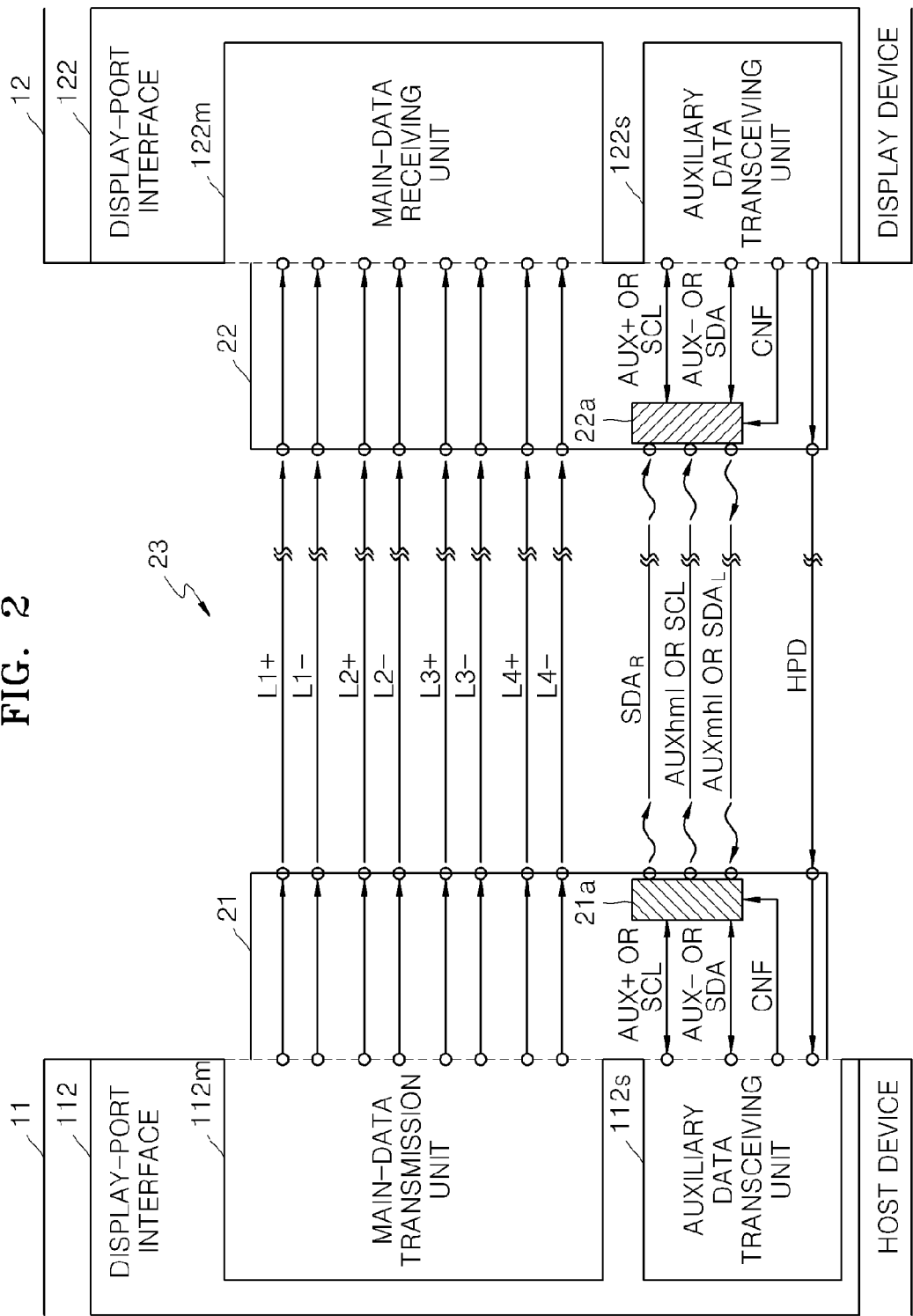
FIG. 2 is a block diagram of a dual-mode display-port system employing dual mode display-port connectors according to an embodiment of the present invention.

FIG. 2 is a block diagram of a dual-mode display-port system employing dual mode display-port connectors 21 to 23 according to an embodiment of the present invention. In FIG. 2, reference numerals that are the same as those in FIG. 1 denote elements having the same functions. That is, the dual-mode display-port system is as described above with reference to FIG. 1 and thus the dual mode display-port connectors 21 to 23 according to an embodiment of the present invention and matters related thereto will be described below. In FIG. 2, a reference numeral 21 denotes a host-side interface and a reference numeral 22 denotes a display-side interface.

Referring to FIG. 2, the dual mode display-port connectors 21 to 23 according to an embodiment of the present invention connect a host device 11 and a display device 12 according to the display-port communication standards proposed by the Video Electronics Standards Association (VESA). The dual mode display-port connectors 21 to 23 include a host-side auxiliary interface 21a, a display-side auxiliary interface 22a, and a cable 23, respectively.

The host-side auxiliary interface 21a is included in the host-side interface 21, and the display-side auxiliary interface 22a is included in the display-side interface 22.

The host-side auxiliary interface 21a is connected to auxiliary signal terminals of the host device 11. The display-side auxiliary interface 22a is connected to auxiliary signal terminals of the display device 12.

A communication mode between the host-side auxiliary interface 21a and the display-side auxiliary interface 21b is determined by voltages of a configuration terminal CNF of the host device 11 and a configuration terminal CNF of the display device 12.

When the voltages of the configuration terminal CNF of the host device 11 and the configuration terminal CNF of the display device 12 are low, auxiliary communication is established using differential auxiliary signals. When the voltages of the configuration terminal CNF of the host device 11 and the configuration terminal CNF of the display device 12 are high, auxiliary communication is established using inter-integrated circuit ($I^2C$) signals.

In the present embodiment, a single auxiliary signal Auxhml or $I^2C$ signals SCL and $SDA_R$ that are to be transmitted from the host-side auxiliary interface 21a to the display-side auxiliary interface 22a are transmitted in the form of optical signals via optical fiber lines included in the cable 23. In the present embodiment, the single auxiliary signal Auxmhl or $I^2C$ signal $SDA_L$ that are to be transmitted from the display-side auxiliary interface 22a to the host-side auxiliary interface 21a are transmitted in the form of optical signals via optical fiber lines.

When auxiliary communication is established using the $I^2C$ signals, the $I^2C$ signals SCL and $SDA_R$ that are to be transmitted from the host-side auxiliary interface 21a to the display-side auxiliary interface 22a include a clock signal SCL and serial data signals $SDA_R$. The $I^2C$ signals $SDA_L$ that are to be transmitted from display-side auxiliary interface 22a to the host-side auxiliary interface 21a are serial data signals $SDA_L$.

In the present embodiment, differential main-data signals L1+ to L4− and hot plug detection signals HPD are transmitted via electrical transmission lines as in the related art.

The host-side auxiliary interface 21a and the display-side auxiliary interface 22a will be described in detail with reference to FIGS. 3 to 7 below.

Figure 3:
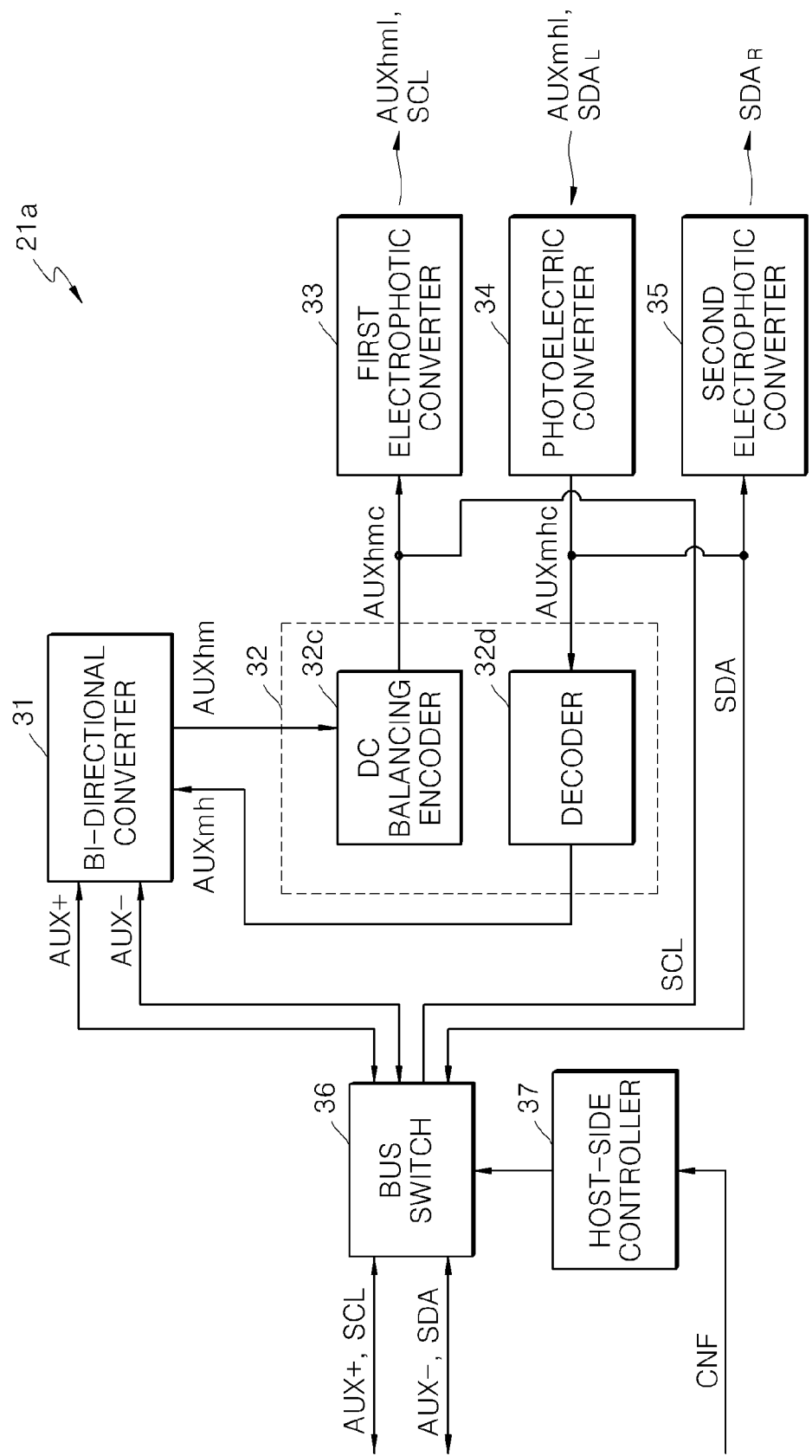
FIG. 3 is a block diagram of an internal structure of a host-side auxiliary interface of the dual mode display-port connectors of FIG. 2.

FIG. 3 is a block diagram of an internal structure of the host-side auxiliary interface 21a of the dual mode display-port connectors 21 to 23 of FIG. 2. In FIG. 3, the same reference numerals that are the same as in FIG. 2 denote elements having the same functions.

Referring to FIGS. 2 and 3, the host-side auxiliary interface 21a includes a bi-directional converter 31, a direct-current (DC) balancing codec 32, a first electrophotic converter 33, a photoelectric converter 34, a second electrophotic converter 35, a bus switch 36, and a host-side controller 37.

Common signal lines drawn from the auxiliary signal terminals of the auxiliary data transceiving unit 112s of the host device 11 are connected to the bus switch 36.

The host-side controller 37 controls a switching operation of the bus switch 36 according to a voltage of a configuration terminal CNF among the auxiliary signal terminals of the auxiliary data transceiving unit 112s of the host device 11.

The bus switch 36 operating by the host-side controller 37 connects lines common signal lines to which differential auxiliary signals AUX+ and AUX− or I²C signals SCL and SDA are supplied to differential auxiliary signal lines or I²C signal lines.

Thus, the differential auxiliary signals AUX+ and AUX− or the I²C signals SCL and SDA may be transmitted or received in the form of optical signals even in a dual mode by using the bus switch 36.

In the host-side auxiliary interface 21a, the bi-directional converter 31 converts the differential auxiliary signals AUX+ and AUX−, which are received from the bus switch 36 via differential auxiliary signal lines, into a single auxiliary signal Auxhm and outputs the single auxiliary signal Auxhm to the DC balancing codec 32.

Also, the bi-directional converter 31 converts a decoding signal Auxmh received from the DC balancing codec 32 into the differential auxiliary signals AUX+ and AUX−, and outputs the differential auxiliary signals AUX+ and AUX− to the bus switch 36 via the differential auxiliary signal lines.

Thus, a problem that the differential auxiliary signals AUX+ and AUX− which are bi-directional signals cannot be transmitted in the form of optical signals may be solved using the bi-directional converter 31.

In the host-side auxiliary interface 21a, the DC balancing codec 32 includes a DC balancing encoder 32c and a decoder 32d.

The DC balancing encoder 32c performs DC balancing encoding on the single auxiliary signal Auxhm received from the bi-directional converter 31, and outputs a single auxiliary signal Auxhmc obtained by performing DC balancing encoding on the single auxiliary signal Auxhm to the first electrophotic converter 33.

The decoder 32d decodes the single auxiliary signal Auxmhc received from the photoelectric converter 34, and outputs a single auxiliary signal Auxmhc obtained by decoding the single auxiliary signal Auxmhc to the bi-directional converter 31.

In the present embodiment, for DC balancing encoding, 8-bit auxiliary data is encoded into a 10-bit signal and the 10-bit signal is decoded into 8-bit auxiliary data.

Thus, a problem that extended display identification data (EDID), display-port configuration data (DPCD), and communication data for link-training the DPCD cause DC unbalance to prevent them from being transmitted or received in the form of optical signals may be solved using the DC balancing codec 32.

In the host-side auxiliary interface 21a, the first electrophotic converter 33 converts the single auxiliary signal Auxhmc received from the DC balancing encoder 32c or the I²C clock signal SCL received from the bus switch 36 into an optical signal Auxhml or SCL, and transmits the optical signal Auxhml or SCL to the display-side auxiliary interface 22a via a first optical fiber line included in the cable 23.

In the host-side auxiliary interface 21a, the photoelectric converter 34 converts an optical signal Auxmhl or $SDA_L$ received from a display-side auxiliary interface 122s via a second optical filter line included in the cable 23 into a single auxiliary signal Auxmhc or an I²C clock signal SCL. The single auxiliary signal Auxmhc is input to the decoder 32d and the I²C clock signal SCL is input to the bus switch 36.

In the host-side auxiliary interface 21a, the second electrophotic converter 35 converts an I²C serial data signal SDA received from bus switch 36 into an optical signal $SDA_R$, and transmits the optical signal $SDA_R$ to the display-side auxiliary interface 22a via a third optical fiber line included in the cable 23.

Figure 4:
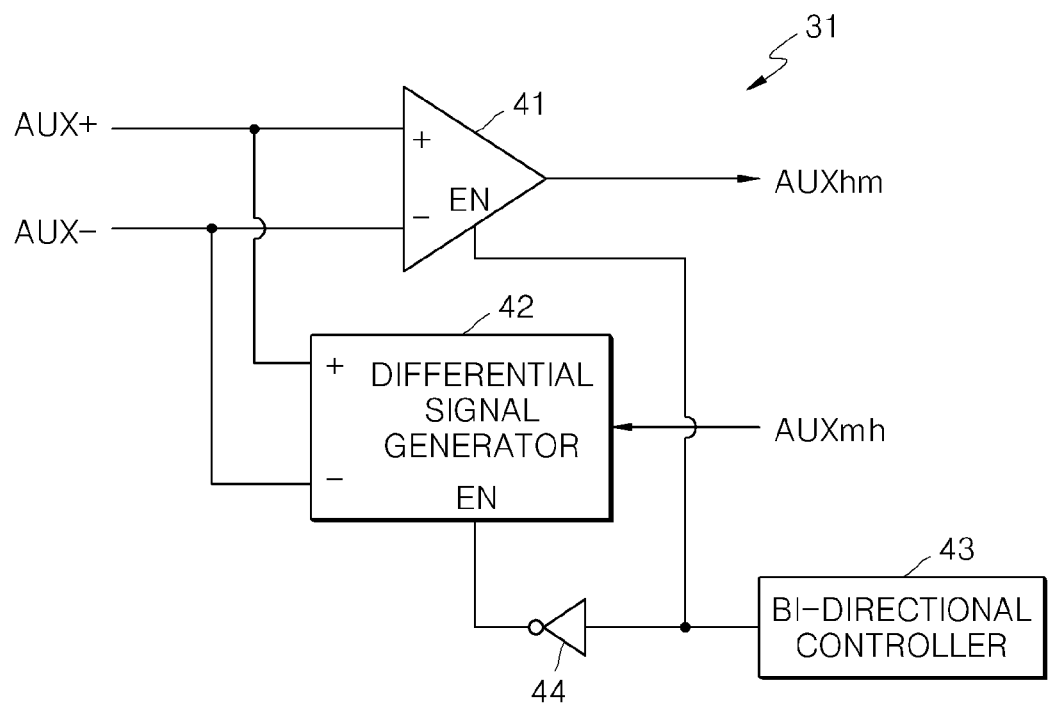
FIG. 4 is a block diagram of an internal structure of a bi-directional converter of FIG. 3.

FIG. 4 is a block diagram of an internal structure of the bi-directional converter 31 of FIG. 3.

Referring to FIGS. 2 to 4, the bi-directional converter 31 included in the host-side auxiliary interface 21a includes a subtractor 41 and a differential signal generator 42.

The subtractor 41 generates a single auxiliary signal Auxhm by receiving a differential auxiliary-plus(+) signal AUX+ and a differential auxiliary minus(−) signal AUX− from the differential auxiliary signal lines of the bus switch 36 and subtracting from the differential auxiliary-minus(−) signal AUX− from the differential auxiliary-plus(+) signal AUX+. In this case, since a bi-directional controller 43 generates an enable control signal that is logic high, the enable control signal that is logic high is input to an enable terminal EN of the subtractor 41, thereby enabling the subtractor 41. An enable control signal that is logic low is input from an inverter 44 to an enable terminal EN of the differential signal generator 42, thereby disabling the differential signal generator 42.

The differential signal generator 42 converts a single auxiliary signal Auxmh received from the decoder 32d into differential auxiliary signals AUX+ and AUX−, and outputs the differential auxiliary signals AUX+ and AUX− to the bus switch 36 via the differential auxiliary signal lines. In this case, since the bi-directional controller 43 generates an enable control signal that is logic low, the enable control signal that is logic low is input to the enable terminal EN of the subtractor 41, thereby disabling the subtractor 41. An enable control signal that is logic high is input from the inverter 44 to the enable terminal EN of the differential signal generator 42, thereby enabling the differential signal generator 42.

Figure 5:
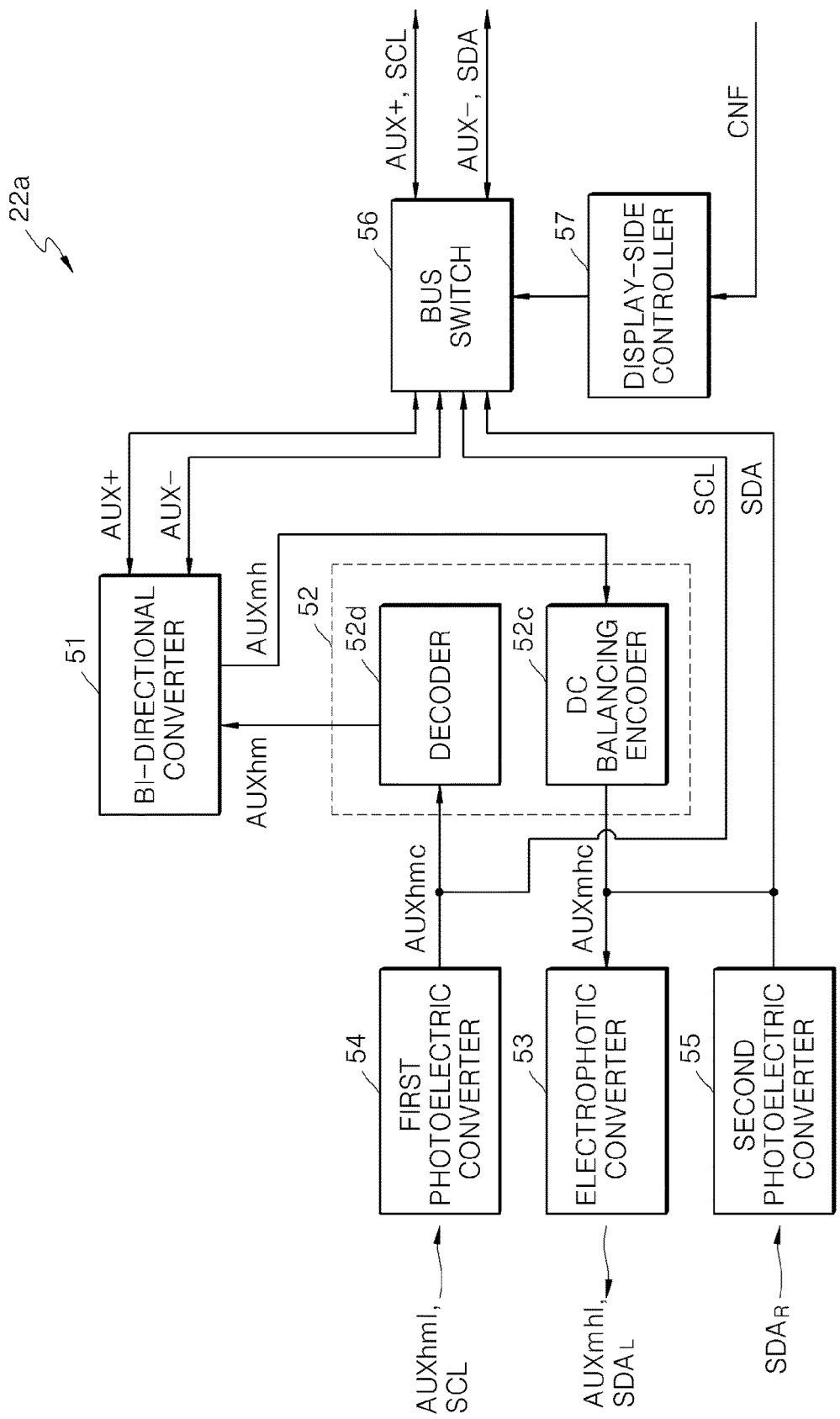
FIG. 5 is a block diagram of an internal structure of a display-side auxiliary interface of the dual mode display-port connectors of FIG. 2.

FIG. 5 is a block diagram of an internal structure of the display-side auxiliary interface 22a of the dual mode display-port connectors 21 to 23 of FIG. 2. Referring to FIGS. 2 and 5, the display-side auxiliary interface 22a includes a bi-directional converter 51, a DC balancing codec 52, an electrophotic converter 53, a first photoelectric converter 54, a second photoelectric converter 55, a bus switch 56, and a display-side controller 57.

Common signal lines drawn from the auxiliary signal terminals of the auxiliary data transceiving unit 122s of the display device 12 are connected to the bus switch 56.

The display-side controller 57 controls a switching operation of the bus switch 56 according to a voltage of configuration terminal CNF among auxiliary signal terminals of the auxiliary data transceiving unit 122s of the display device 12.

The bus switch 56 operating by the display-side controller 57 connects the common signal lines to which differential auxiliary signals AUX+ and AUX− or I²C signals SCL and SDA are supplied to differential auxiliary signal lines or I²C signal lines.

Thus, a problem that the differential auxiliary signals AUX+ and AUX− or the I²C signals SCL and SDA cannot be transmitted or received in the form of optical signals in a dual mode may be solved using the bus switch 56.

In the display-side auxiliary interface 22a, the bi-directional converter 51 converts the differential auxiliary signals AUX+ and AUX− received from the bus switch 56 via the differential auxiliary signal lines into a single auxiliary signal Auxmh, and outputs the single auxiliary signal Auxmh to the DC balancing codec 52.

Also, the bi-directional converter 51 converts a decoding signal Auxhm received from the DC balancing codec 52 into differential auxiliary signals AUX+ and AUX− and outputs the differential auxiliary signals AUX+ and AUX− to the bus switch 56 via the differential auxiliary signal lines.

Thus, a problem that the differential auxiliary signals AUX+ and AUX− which are bi-directional signals cannot be transmitted or received in the form of optical signals may be solved using the bi-directional converter 51.

In the display-side auxiliary interface 22a, the DC balancing codec 52 includes a DC balancing encoder 52c and a decoder 52d.

The DC balancing encoder 52c performs DC balancing encoding on a single auxiliary signal Auxmh received from the bi-directional converter 51, and outputs a single auxiliary signal Auxmhc obtained by performing DC balancing encoding on a single auxiliary signal Auxmh to the electro-photic converter 53.

The decoder 52d decodes the encoded single auxiliary signal Auxhmc received from the first photoelectric converter 54 and outputs a decoded single auxiliary signal Auxhm obtained by decoding the encoded single auxiliary signal Auxhmc to the bi-directional converter 51.

As described above, according to the present embodiment, 8-bit auxiliary data is encoded into 10-bit data for DC balancing encoding, and the 10-bit data is decoded into the 8-bit auxiliary data.

Accordingly, EDID, DPCD, and communication data for link-training the DPCD cause DC unbalance to prevent them from being transmitted or received in the form of optical signals may be solved using the DC balancing codec 52.

In the display-side auxiliary interface 22a, the electro-photic converter 53 converts the single auxiliary signal Auxmhc received from the DC balancing encoder 52c or the I²C serial data signal SDA received from the bus switch 56 into an optical signal Auxmhl or $SDA_L$. The optical signal Auxmhl or $DA_L$ is transmitted to the host-side auxiliary interface 21a via the second optical fiber line included in the cable 23.

In the display-side auxiliary interface 22a, the first photoelectric converter 54 converts an optical signal Auxhml or SCL received from the host-side auxiliary interface 21a via the first optical fiber line in the cable 23 into a single auxiliary signal Auxhmc or I²C clock signal SCL. The single auxiliary signal Auxhmc is input to the decoder 52d and the I²C clock signal SCL is input to the bus switch 56.

In the display-side auxiliary interface 22a, the second photoelectric converter 55 converts an optical signal $SDA_R$ received from the host-side auxiliary interface 21a via the third optical fiber line in the cable 23 into an I²C serial data signal SDA. The serial data signal SDA is input to the bus switch 56.

Figure 6:
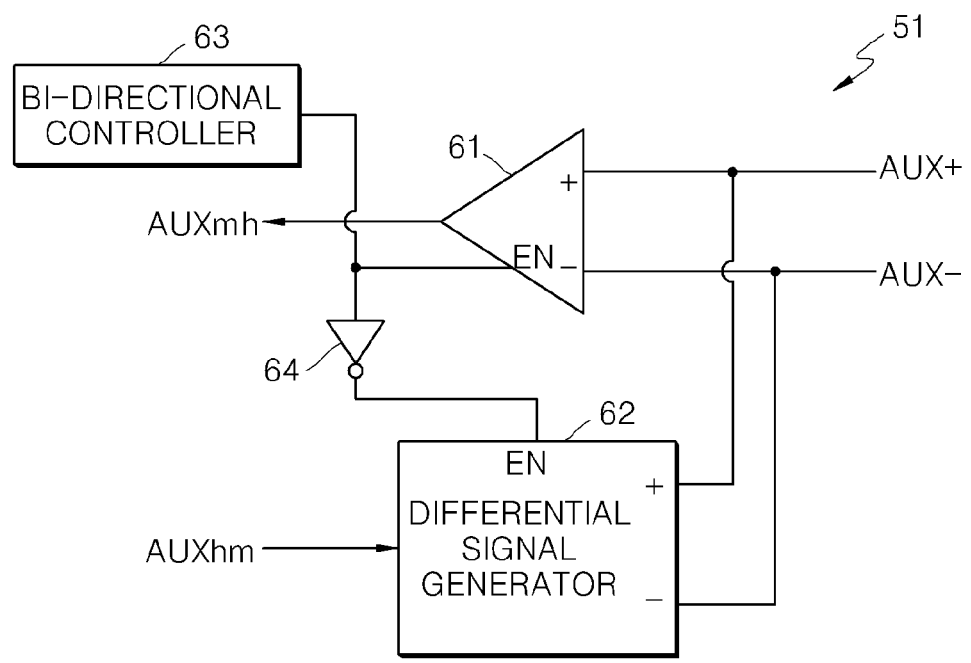
FIG. 6 is a block diagram of an internal structure of a bi-directional converter of FIG. 5.

FIG. 6 is a block diagram of an internal structure of the bi-directional converter 51 of FIG. 5.

Referring to FIGS. 2, 5, and 6, in the display-side auxiliary interface 22a, the bi-directional converter 51 includes a subtractor 61 and a differential signal generator 62.

The subtractor 61 receives a differential auxiliary-plus(+) signal AUX+ and a differential auxiliary-minus(−) signal AUX− from the bus switch 56 via the differential auxiliary signal lines and subtracts the differential auxiliary-minus(−) signal AUX− from the differential auxiliary-plus(+) signal AUX+ to generate a single auxiliary signal Auxmh. In this case, since a bi-directional controller 63 generates an enable control signal that is logic high, the enable control signal that is logic high is input to an enable terminal EN of the subtractor 61, thereby enabling the subtractor 61. An enable control signal that is logic low is input from the inverter 64 to an enable terminal EN of the differential signal generator 62, thereby disabling the differential signal generator 62.

The differential signal generator 62 converts a single auxiliary signal Auxhm received from the decoder 52d into differential auxiliary signals AUX+ and AUX−. The differential auxiliary signals AUX+ and AUX− are input to the bus switch 56 via the differential auxiliary signal lines. In this case, since the bi-directional controller 63 generates an enable control signal that is logic low, the enable control signal that is logic low is input to the enable terminal EN of the subtractor 61, thereby disabling the subtractor 61. An enable control signal that is logic high is input from the inverter 64 to the enable terminal EN of the differential signal generator 62, thereby enabling the differential signal generator 62.

Figure 7:
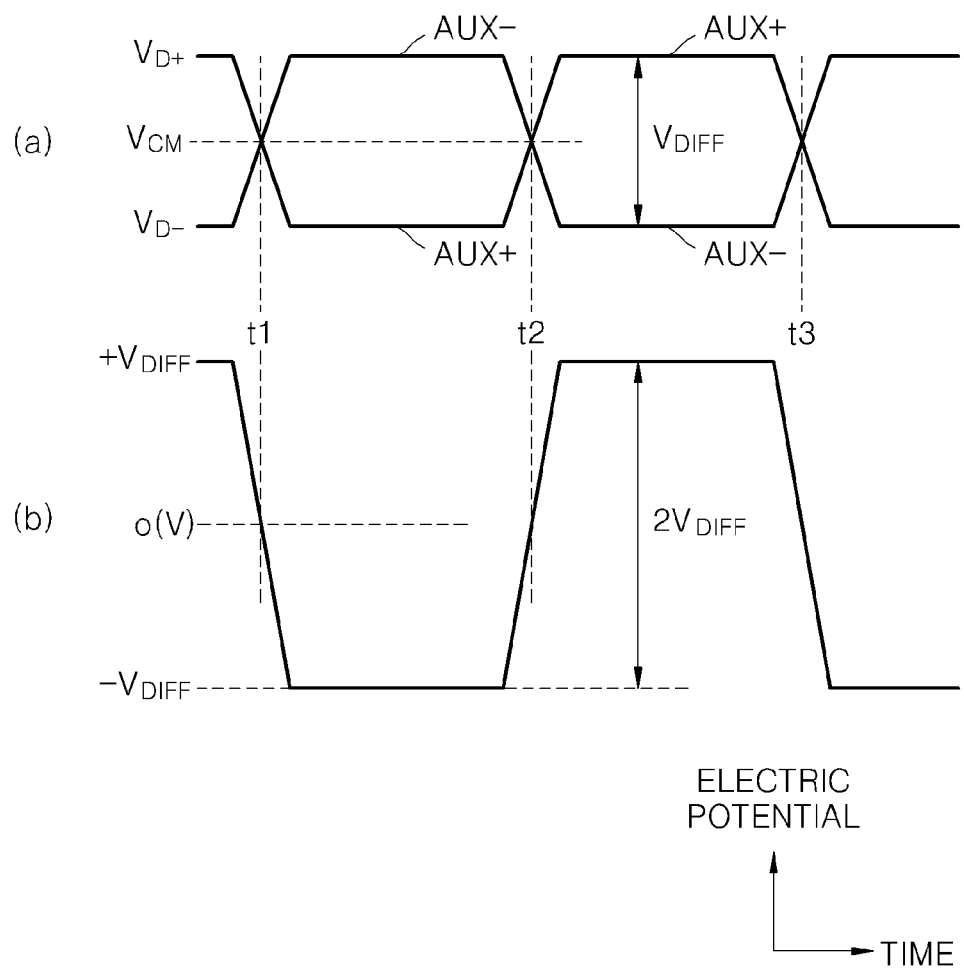
FIG. 7 is a waveform diagram illustrating the relationship between differential auxiliary signals and single auxiliary signals of FIG. 6.

FIG. 7 is a waveform diagram illustrating the relationship between the differential auxiliary signals AUX+ and AUX− and single auxiliary signals AUXmh and AUXhm of FIG. 6. FIG. 7(a) illustrates the waveforms of the differential auxiliary signals AUX+ and AUX−. FIG. 7(b) illustrates the waveforms of the single auxiliary signals AUXmh and AUXhm.

Referring to FIGS. 6 and 7, the differential auxiliary signals AUX+ and AUX− that are input to or output from an auxiliary-plus(+) signal terminal and an auxiliary-minus(−) signal terminal have a low positive potential $V_{D-}$ or a high positive potential $V_{D+}$ based on an intermediate positive potential $V_{CM}$, and the polarities thereof are reversed. That is, the difference between electric potentials of the differential auxiliary signals AUX+ and AUX− is a constant potential $V_{DIFF}$.

In the case of the single auxiliary signals AUXmh and AUXhm, the intermediate straight-polarity potential $V_{CM}$ between the differential auxiliary signals AUX+ and AUX− is 0 volts which is a ground potential. The low straight-polarity potential $V_{D-}$ and the high straight-polarity potential $V_{D+}$ of the differential auxiliary signals AUX+ and AUX− correspond to a reverse-polarity potential and a straight-polarity potential, respectively.

In this state, a single auxiliary signal AUXmh is obtained by subtracting the auxiliary signal AUX− from the auxiliary signal AUX+ among the differential auxiliary signals AUX+ and AUX−. Thus, a pulse height $2V_{DIFF}$ of the single auxiliary signals AUXmh and AUXhm is twice the potential $V_{DIFF}$ between the differential auxiliary signals AUX+ and AUX−.

For example, a signal having a logic value '0' is obtained between a point of time t1 and a point of time t2, and a signal having a logic value '1' is obtained between the point of time t2 and a point of time t3.

The differential signal generator 62 performs the processes described above in a reverse order.

Figure 8:
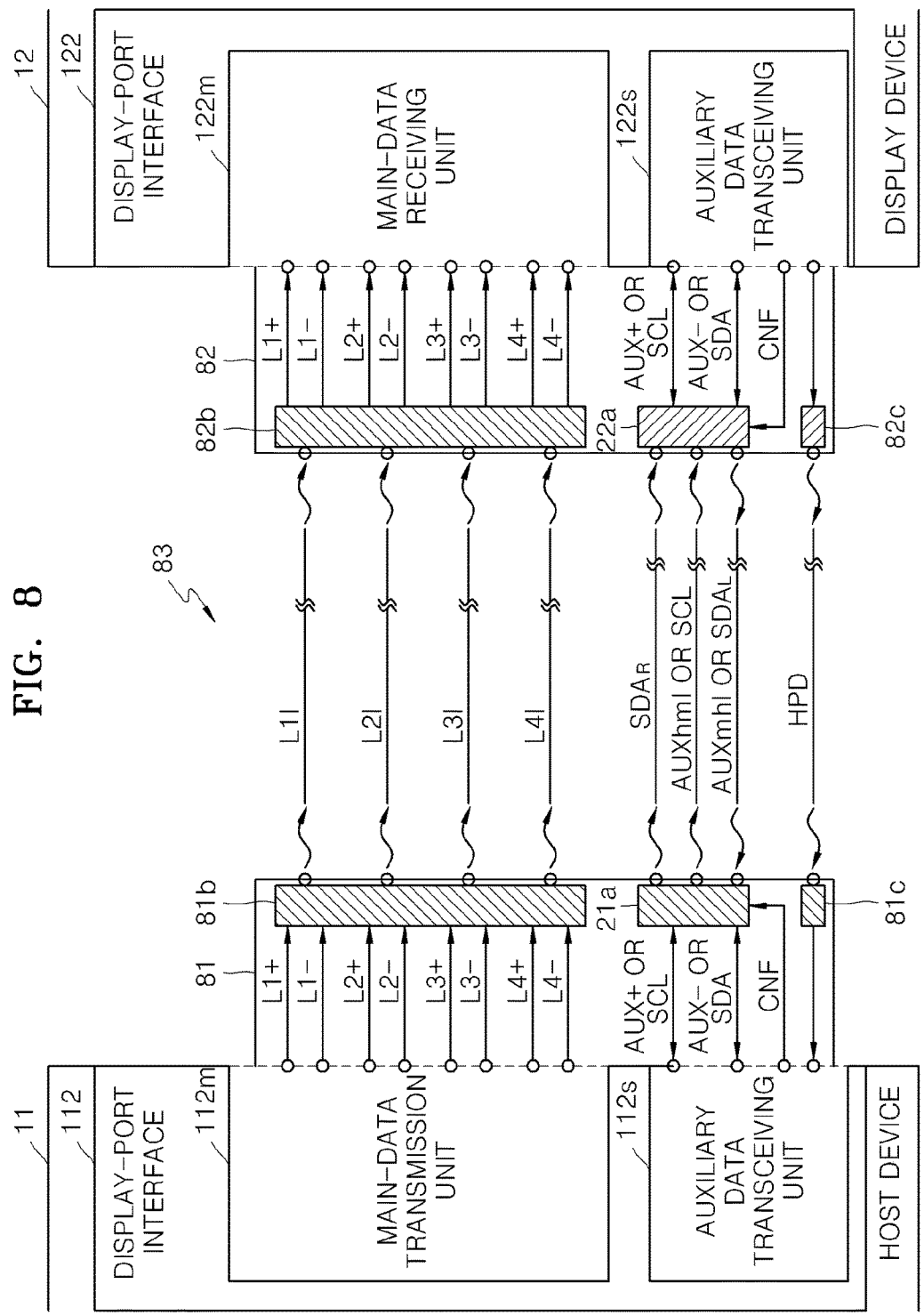
FIG. 8 is a block diagram of a dual-mode display-port system employing dual mode display-port connectors according to another embodiment of the present invention.

FIG. 8 is a block diagram of a dual-mode display-port system employing dual mode display-port connectors 81 to 83 according to another embodiment of the present invention. In FIG. 8, the same reference numerals that are the same as in FIG. 2 denote elements having the same functions.

Thus, the dual-mode display-port system according to the present embodiment of FIG. 8 will be described focusing on differences from the dual-mode display-port system of FIG. 2 below.

Referring to FIG. 8, the host-side interface 81 includes a host-side auxiliary interface 21a, and further includes a host-side main interface 81b and a host-side access-signal interface 81c.

The host-side main interface 81b is connected to a main signal L1+ terminal to a main signal L4− terminal of a host device 11.

The host-side access-signal interface 81c is connected to a hot plug detection signal HPD terminal of the host device 11.

The display-side interface 82 includes a display-side auxiliary interface 22a, and further includes a display-side main interface 82b and a display-side access-signal interface 82c to correspond to the above elements of the host-side interface 81 described above.

The display-side main interface 82b is connected to a main signal L1+ terminal to a main signal L4− terminal of a display device 12.

The display-side access-signal interface 82c is connected to a hot plug detection signal HPD terminal of the display device 12.

Here, main data L1+ to L4− that are to be transmitted from the host-side main interface 81b to the display-side main interface 82b are transmitted in the form of optical signals. Also, a hot plug detection signal HPD that is to be transmitted from the display-side access-signal interface 82c to the host-side access-signal interface 81c is transmitted in the form of an optical signal.

Here, the hot plug detection signal HPD is a single signal other than differential signals.

Thus, the display-side access-signal interface 82c is an electrophotic converter that converts the hot plug detection signal HPD received from an HPD terminal of the display device 12 into an optical signal and that transmits the optical signal to the host-side access-signal interface 81c via an optical fiber line.

Also, the host-side access-signal interface 81c is a photoelectric converter that converts the hot plug detection signal HPD received from the display-side access-signal interface 82c into an electrical signal.

Figure 9:
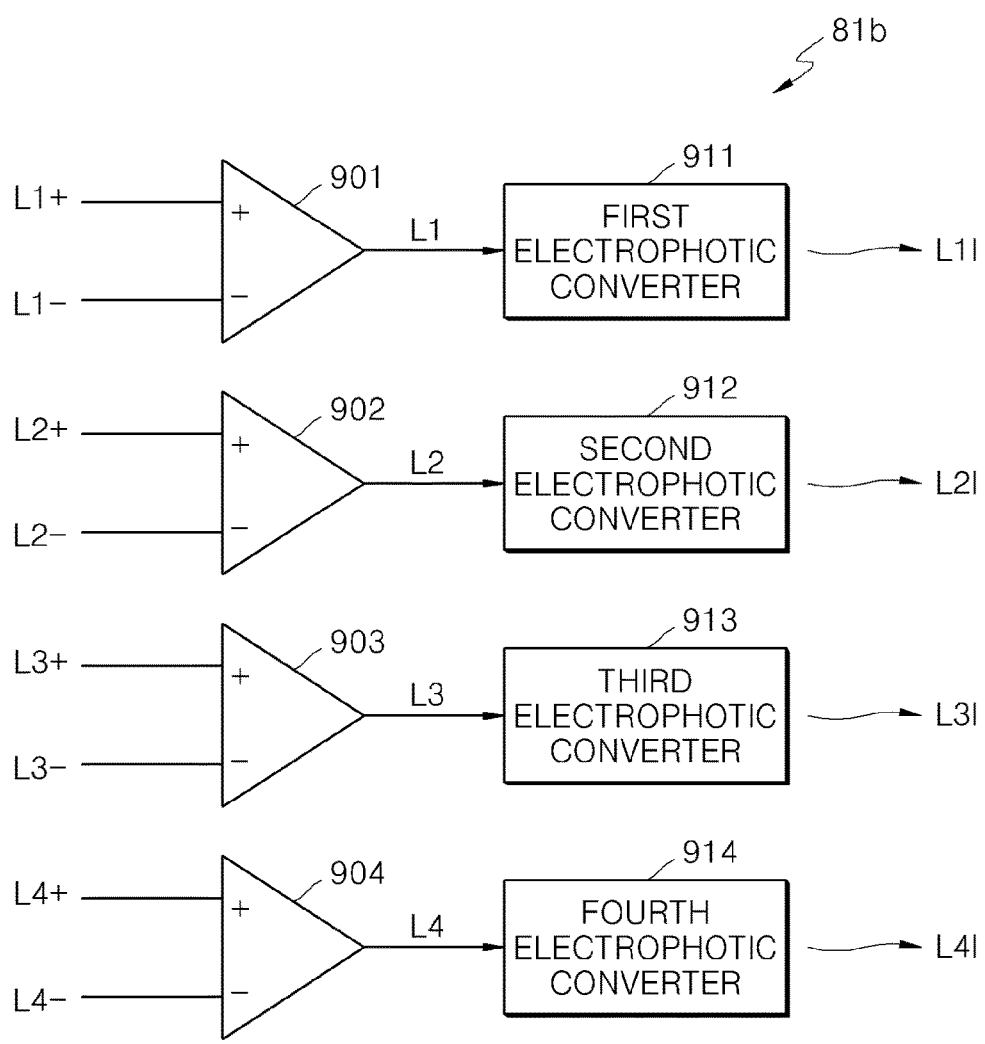
FIG. 9 is a block diagram of an internal structure of a host-side main interface of the dual mode display-port connectors of FIG. 8.

FIG. 9 is a block diagram of an internal structure of the host-side main interface 81b of the dual mode display-port connectors 81 to 83 of FIG. 8.

Referring to FIGS. 8 and 9, the host-side main interface 81b includes four subtractors 901 to 904 and four electrophotic converters 911 to 914.

The four subtractors 901 to 904 convert differential main signals L1+ to L4− received from main signal terminals of the host device 11 into single main signals L1 to L4, respectively.

That is, the subtractors 901 to 904 generate the single main signals L1 to L4 by subtracting main-minus(−) signals L1−, L2−, L3−, and L4− from differential main-plus(+) signals L1+, L2+, L3+, and L4+ received from main signal terminals of the host device 11, respectively.

The four electrophotic converters 911 to 914 convert the single main signals L1 to L4 received from the subtractors 901 to 904 into optical signals L11 to L41 and transmit the optical signals L11 to L41 to the display-side main interface 82b via optical fiber lines.

Figure 10:
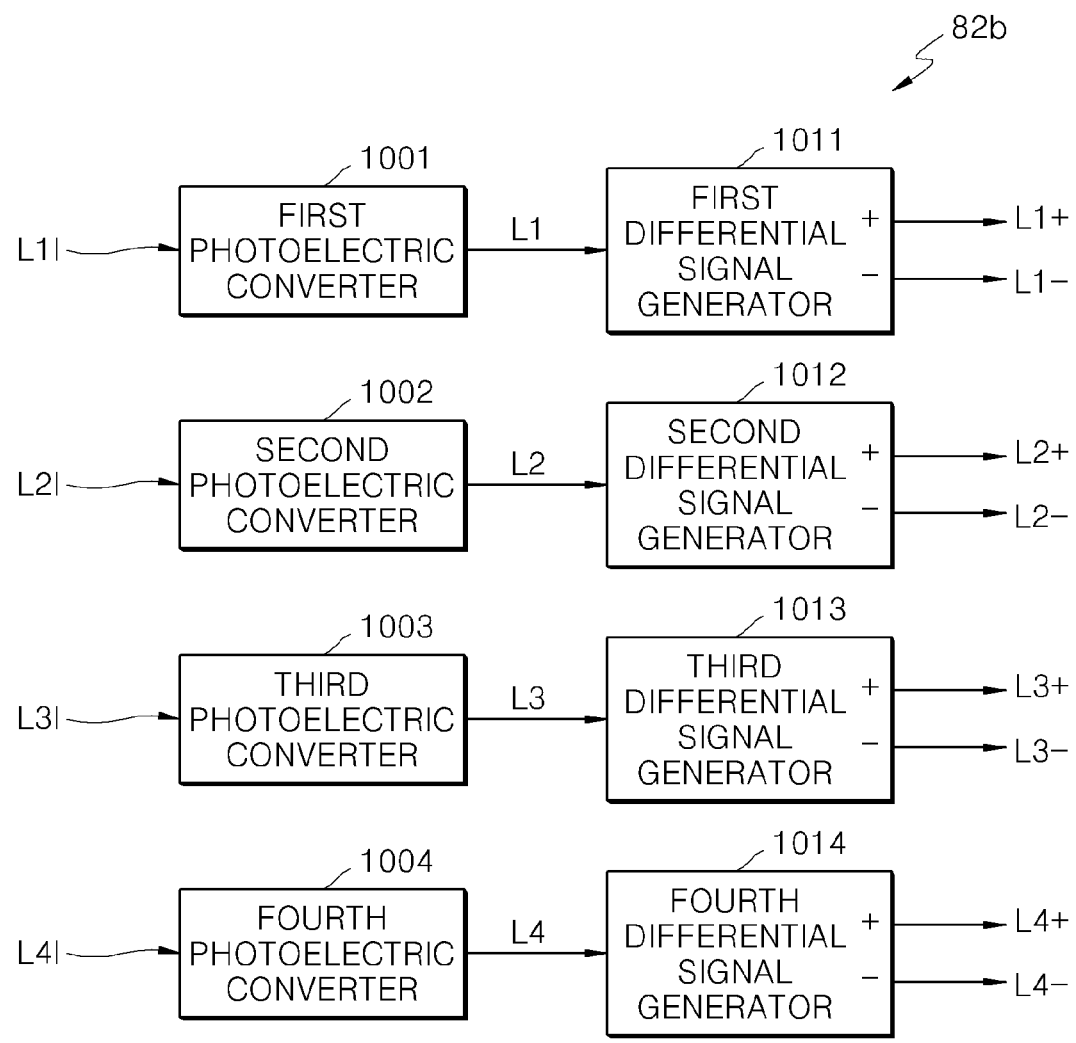
FIG. 10 is a block diagram of an internal structure of a display-side main interface of the dual mode display-port connectors of FIG. 8.

FIG. 10 is a block diagram of an internal structure of the display-side main interface 82b of the dual mode display-port connectors 81 to 83 of FIG. 8.

Referring to FIGS. 8 and 10, the display-side main interface 82b includes four photoelectric converters 1001 to 1004 and four differential signal generators 1011 to 1014.

The photoelectric converters 1001 to 1004 convert optical signals L11 to L41 received from the host-side main interface 81b via optical fiber lines thereof into main data signals L1 to L4.

The differential signal generators 1011 to 1014 convert the main data signals L1 to L4 received from the photoelectric converters 1001 to 1004 into differential main-data signals L1+ to L4−, respectively.

As described above, in the dual mode display-port connectors according to the one or more of the above embodiments of the present invention, a problem that bi-directional differential auxiliary signals cannot be transmitted or received in the form of optical signals can be solved using a bi-directional converter of either a host-side auxiliary interface or a display-side auxiliary interface.

Also, a problem that EDID, DPCD, and communication data for link-training the DPCD cause DC unbalance, thereby preventing them from being transmitting or received in the form of optical signals can be solved using a DC balancing codec of either the host-side auxiliary interface or the display-side auxiliary interface.

Furthermore, a problem that differential auxiliary signals or I²C signals cannot be transmitted or received in the form of optical signals in a dual mode can be solved using a bus switch of either the host-side auxiliary interface or the display-side auxiliary interface.

Thus, in the dual mode display-port connectors according to the one or more embodiments, optical communication can be established between the host-side auxiliary interface and the display-side auxiliary interface.

Accordingly, noise or signal attenuation can be prevented from occurring when the EDID and the DPCD are transmitted to a long distance in the form of differential auxiliary signals or I²C signals or when long-distance DPCD communication is established.

While the present invention has been particularly shown and described with reference to exemplary embodiments thereof, it will be understood by those of ordinary skill in the art that various changes in form and details may be made therein without departing from the spirit and scope of the invention as defined by the appended claims. It should be understood that the exemplary embodiments should be considered in a descriptive sense only and not for purposes of limitation. Descriptions of features or aspects within each embodiment should typically be considered as available for other similar features or aspects in other embodiments.

What is claimed is:

1. A dual mode display-port which connects a host device and a display device according to the display-port communication standards proposed by the Video Electronics Standards Association (VESA), the dual mode display-port connector comprising:

a host-side auxiliary interface connected to auxiliary signal terminals of the host device;

a display-side auxiliary interface connected to auxiliary signal terminals of the display device; and a cable for connecting the host-side auxiliary interface and the display-side auxiliary interface, wherein the host-side auxiliary interface comprises:

a bi-directional converter for converting differential auxiliary signals received via one side thereof into a single auxiliary signal and a single auxiliary signal received via another side thereof into differential auxiliary signals;

a direct-current (DC) balancing codec for performing DC balancing encoding on a single auxiliary signal received via one side thereof, and decoding an encoded single auxiliary signal obtained through an encoding process and received via another side thereof; and a bus switch for connecting common signal lines to which differential auxiliary signals or inter-integrated circuit (I²C) signals are supplied to differential auxiliary signal lines or I²C signal lines, wherein, in the host-side auxiliary interface, the common signal lines are drawn from the auxiliary signal terminals of the host device and connected to the bus switch, and wherein the host-side auxiliary interface further comprises:
a first electrophotic converter;
a photoelectric converter; and
a second electrophotic converter, and
wherein, when the I²C signals are selected according to a voltage of a configuration terminal of the host device, a clock signal is transmitted in the form of an optical signal to the display-side auxiliary interface from the first electrophotic converter, a serial data signal is transmitted in the form of an optical signal to the photoelectric converter from the display-side auxiliary interface, and a serial data signal is transmitted in the form of an optical signal to the display-side auxiliary interface from the second electrophotic converter.

2. The dual mode display-port connector of claim 1, wherein, when the differential auxiliary signals are selected according to the voltage of the configuration terminal of the host device, an encoded single auxiliary signal obtained through an encoding process is transmitted in the form of an optical signal to the display-side auxiliary interface from the first electrophotic converter, and encoded single auxiliary signal obtained through an encoding process is transmitted in the form of an optical signal to the photoelectric converter from the display-side auxiliary interface.

3. The dual mode display-port connector of claim 2, wherein the bi-directional converter converts the differential auxiliary signals received from the bus switch via the differential auxiliary signal lines into a single auxiliary signal and outputs the single auxiliary signal to the DC balancing codec, and converts a decoding signal received from the DC balancing codec into differential auxiliary signals and outputs the differential auxiliary signals to the bus switch via the differential auxiliary signal lines.

4. The dual mode display-port connector of claim 3, wherein the DC balancing codec comprises:
a DC balancing encoder for performing DC balancing encoding on the single auxiliary signal received from the bi-directional converter, and outputting an encoded single auxiliary signal obtained by performing DC balancing encoding on the single auxiliary signal to the first electrophotic converter; and
a decoder for decoding the encoded single auxiliary signal from the photoelectric converter and outputting the decoded single auxiliary signal to the bi-directional converter.

5. A dual mode display-port which connects a host device and a display device according to the display-port communication standards proposed by the Video Electronics Standards Association (VESA), the dual mode display-port connector comprising:
a host-side auxiliary interface connected to auxiliary signal terminals of the host device;
a display-side auxiliary interface connected to auxiliary signal terminals of the display device; and
a cable for connecting the host-side auxiliary interface and the display-side auxiliary interface, wherein the host-side auxiliary interface comprises:
a bi-directional converter for converting differential auxiliary signals received via one side thereof into a single auxiliary signal and a single auxiliary signal received via another side thereof into differential auxiliary signals;
a direct-current (DC) balancing codec for performing DC balancing encoding on a single auxiliary signal received via one side thereof, and decoding an encoded single auxiliary signal obtained through an encoding process and received via another side thereof; and
a bus switch for connecting common signal lines to which differential auxiliary signals or inter-integrated circuit (I²C) signals are supplied to differential auxiliary signal lines or I²C signal lines,
wherein a host connection including the host-side auxiliary interface further comprises:
a host-side main interface connected to main signal terminals of the host device; and
a host-side access-signal interface connected to a hot plug detection signal terminal of the host device,
wherein a display connection unit including the display-side auxiliary interface further comprises:
a display-side main interface connected to main signal terminals of the display device; and
display side access-signal interface connected to a hot plug detection signal terminal of the display device,
wherein main data that is to be transmitted from the host-side main interface to the display-side main interface is transmitted in the form of an optical signal, and an access signal that is to be transmitted from the display-side access-signal interface to the host-side access-signal interface is transmitted in the form of an optical signal, and
wherein the host-side main interface comprises:
a plurality of subtractors for converting differential main signals received from the main signal terminals of the host device into single main signals, respectively; and
a plurality of electrophotic converters for converting the single main signals received from the plurality of subtractors into optical signals, and transmitting the optical signals to the display-side main interface via optical fiber lines thereof, respectively.

6. A dual mode display-port which connects a host device and a display device according to the display-port communication standards proposed by the Video Electronics Standards Association (VESA), the dual mode display-port connector comprising:
a host-side auxiliary interface connected to auxiliary signal terminals of the host device;
a display-side auxiliary interface connected to auxiliary signal terminals of the display device; and
a cable for connecting the host-side auxiliary interface and the display-side auxiliary interface,
wherein the host-side auxiliary interface comprises:
a bi-directional converter for converting differential auxiliary signals received via one side thereof into a single auxiliary signal and a signal auxiliary signal received via another side thereof into differential auxiliary signals;
a direct-current (DC) balancing codec for performing DC balancing encoding on a single auxiliary signal received via one side thereof, and decoding an encoded single auxiliary signal obtained through an encoding process and received via another side thereof; and a bus switch for connecting common signal lines to which differential auxiliary signals or inter-integrated circuit (I²C) signals are supplied to differential auxiliary signal lines or I²C signal lines,
    wherein a host connection including the host-side auxiliary interface further comprises:
        a host-side main interface connected to main signal terminals of the host device; and
        a host-side access-signal interface connected to a hot plug detection signal terminal of the host device,
    wherein a display connection unit including the display-side auxiliary interface further comprises:
        a display-side main interface connected to main signal terminals of the display device; and
        a display-side access-signal interface connected to a hot plug detection signal terminal of the display device,
wherein main data that is to be transmitted from the host-side main interface to the display-side main interface is transmitted in the form of an optical signal, and an access signal that is to be transmitted from the display-side access-signal interface to the host-side access-signal interface is transmitted in the form of an optical signal, and
    wherein the display-side main interface comprises:
        a plurality of photoelectric converters for converting optical signals received from the host-side main interface via optical fiber lines thereof into main data signals; and
        a plurality of differential signal generators for converting the main data signals received from the plurality of photoelectric converters into differential main-data signals, respectively.

7. A dual mode display-port which connects a host device and a display device according to the display-port communication standards proposed by the Video Electronics Standards Association (VESA), the dual mode display-port connector comprising:
    a host-side auxiliary interface connected to auxiliary signal terminals of the host device;
    a display-side auxiliary interface connected to auxiliary signal terminals of the display device; and
    a cable for connecting the host-side auxiliary interface and the display-side auxiliary interface,
the display-side auxiliary interface comprises:
    a bi-directional converter for converting differential auxiliary signals received via one side thereof into a single auxiliary signal and a single auxiliary signal received via another side thereof into differential auxiliary signals;
    a direct-current (DC) balancing codec for performing DC balancing encoding on a single auxiliary signal received a one side thereof, and decoding an encoded single auxiliary signal obtained through an encoding process and received via another side thereof; and
a bus switch for connecting common signal lines to which differential auxiliary signals or inter-integrated circuit (I²C) signals are supplied to differential auxiliary signal lines or I²C signal lines,
    wherein, in the display-side auxiliary interface, the common signal lines are drawn from the auxiliary signal terminals of the display device and connected to the bus switch, and
    wherein the display-side auxiliary interface further comprises:
    a first photoelectric converter;
    an electrophotic converter; and
    a second photoelectric converter,
    wherein, when the I²C signals are selected according to a voltage of a configuration terminal of the display device, a clock signal is transmitted in the form of an optical signal to the first photoelectric converter from the host-side auxiliary interface, a serial data signal is transmitted in the form of an optical signal to the host-side auxiliary interface from the electrophotic converter, and a serial data signal is transmitted in the form of an optical signal to the second photoelectric converter from the host-side auxiliary interface.

8. The dual mode display-port connector of claim 7, wherein, when the differential auxiliary signals are selected according to the voltage of the configuration terminal of the display device, an encoded auxiliary signal obtained through an encoding process is transmitted in the form of an optical signal to the first photoelectric converter from the host-side auxiliary interface, and an encoded single auxiliary signal obtained through an encoding process is transmitted in the form of an optical signal to the host-side auxiliary interface from the electrophotic converter.

9. The dual mode display-port connector of claim 8, wherein the bi-directional converter included in the display-side auxiliary interface converts differential auxiliary signals received from the bus switch of the display-side auxiliary interface via the differential auxiliary signal lines into a single auxiliary signal and outputs the single auxiliary signal to the DC balancing codec, and converts a decoding signal received from the DC balancing codec into differential auxiliary signals and outputs the differential auxiliary signals to the bus switch via the differential auxiliary signal lines.

10. The dual mode display-port connector of claim 9, wherein the DC balancing codec comprises:
    a DC balancing encoder for performing DC balancing encoding on the single auxiliary signal received from the bi-directional converter, and outputting an encoded single auxiliary signal obtained by performing DC balancing encoding on the single auxiliary signal to the electrophotic converter; and
    a decoder for decoding the encoded single auxiliary signal received from the first photoelectric converter and outputting the decoded single auxiliary signal to the bi-directional converter.

* * * * *